Aug. 28, 1928.
S. L. JOINER
1,682,282
STOP PIN FOR COUPLING HEADS
Filed July 28, 1927
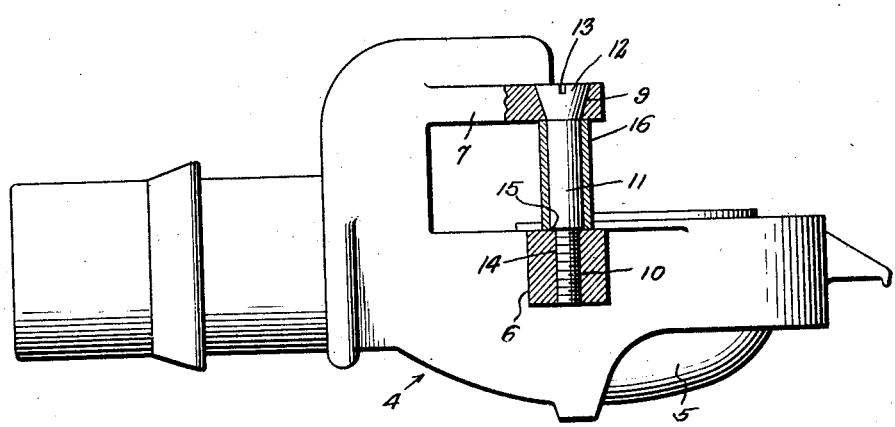
Inventor
S. L. Joiner,
By
Attorney Patented Aug. 28, 1928.

1,682,282

UNITED STATES PATENT OFFICE.

SYLVESTER L. JOINER, OF McGREGOR, TEXAS.

STOP PIN FOR COUPLING HEADS.

Application filed July 28, 1927. Serial No. 208,945.

This invention relates to stop pins for coupling heads particularly coupling heads employed in air brake hose lines.

One object of the invention is to overcome useless waste now practiced in discarding coupling heads when the stop pins become worn, bent, loose or broken by the substitution of a simple strong, durable and effective and readily applied means designed not only to take the place of a broken stop pin but to perform the original function intended in a far more satisfactory manner.

Another object of the invention resides in the provision of a new style of stop pin for air brake hose line coupling members which may be applied to the coupling members when first manufactured or which may be easily and readily applied to manufactured coupling members in the event of defective stop pins rendered ineffective from whatever cause.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings there is illustrated a side elevation of a coupling head, partly in section, illustrating my invention as applied.

Referring now more particularly to the accompanying drawings, the reference character 4 indicates an air brake coupling of common construction, including a head 5 having the usual boss 6, and the usual arm 7, between which, and the boss, the stop pin is secured.

In the use of these couplings the common stop pins frequently break and they often become bent and sometimes become loose and work out of their sockets, and in such instances, the coupling head is rendered useless, and necessitates discarding the same, and of course, considerable expense is involved in the matter of replacement. There is considerable jar produced in the coupling action and there is likewise jar incident to the rolling stock in travel and stopping and starting. Frequently the arm 7 is spread away from the head 5 or contracted toward the head when the pin is bent, due to action of coupling the coupling members together or because of other jarring, resulting in leakage of air because of an ineffective sealed joint around the gaskets.

In the event of such damage as I have outlined above, I propose to obviate the waste in discarding the coupling members. I remove the common stop pin and convert the aperture into which the upper end of the common stop pin is fitted in the arm 7 into a tapering aperture 9 and the perforation in the boss 6 is converted into a screw threaded aperture 10 extending entirely through the boss. I then employ a bolt 11 provided at one end with a tapering head 12 which has working fit in the tapering aperture 9, a slot 13 being formed in the head 12 to facilitate operation of the bolt. The lower end of the bolt 11 is reduced, as at 14, to form a shoulder 15 and the reduced portion 14 is screw threaded for screw threaded fit in the screw threaded aperture. The bolt 11 is secured to the boss 6 with the shoulder 15 bearing tightly against the boss and this together with the tapering or other head 12 of the bolt 11 prevents contraction or expansion of the arm 7 toward or away from the head of the coupling member. The device is simple and effective and prevents considerable waste and the operation to effect this saving is readily applied and carried out.

To facilitate the coupling action and to provide against the chances of breaking the stop pin 11 or bending the same as well as to prevent undue wear on the stop pin incident to friction or rubbing action on the stop pin due to the coupling and uncoupling operations and incident to movement of the coupling members upon each other during travel or stopping and starting, I enclose the stop pin within a sleeve or roller 16, as shown. This sleeve or roller 16 is loose on the stop pin and reduces friction and protects the stop pin and assists the latter in preventing contraction of the arm 7 toward the head of the coupling member.

What is claimed is:

1. The combination with a coupling head having a boss provided with a screw threaded aperture and an arm provided with an aperture, of a bolt provided with a head adapted to fit in the aperture of the arm and at one end reduced to provide a shoulder to bear against one face of said boss, the reduced end of the bolt being screw threaded for threaded engagement in the screw threaded aperture of the boss, whereby to prevent contraction of said arm toward the coupling head or expansion therefrom incident to jars.

2. The combination with a coupling head having a boss provided with a screw threaded aperture and an arm provided with an aperture, of a bolt provided with a head adapted to fit in the aperture of the arm and at one end reduced to provide a shoulder to bear against one face of said boss, the reduced end of the bolt being screw threaded for threaded engagement in the screw threaded aperture of the boss, whereby to prevent contraction of said arm toward the coupling head or expansion therefrom incident to jars, and a sleeve loose on the bolt between the coupling head and arm.

In testimony whereof I have hereunto set my hand.

SYLVESTER L. JOINER.